(12) United States Patent
Gutowski et al.

(10) Patent No.: US 7,359,712 B2
(45) Date of Patent: *Apr. 15, 2008

(54) METHOD AND APPARATUS FOR CONFIRMING POSITION OF A MOBILE STATION

(75) Inventors: Gerald J. Gutowski, Chicago, IL (US); Stanley J. Benes, Round Lake Beach, IL (US)

(73) Assignee: Motorola, Inc., Schaumburg, IL (US)

( * ) Notice: Subject to any disclaimer, the term of this patent is extended or adjusted under 35 U.S.C. 154(b) by 1168 days.

This patent is subject to a terminal disclaimer.

(21) Appl. No.: 10/193,375

(22) Filed: Jul. 11, 2002

(65) Prior Publication Data

US 2004/0202139 A1 Oct. 14, 2004

(51) Int. Cl.
*H04Q 7/20* (2006.01)
*H04M 11/04* (2006.01)
*H04B 7/185* (2006.01)

(52) U.S. Cl. .............................. 455/456.1; 455/404.2; 342/357.01

(58) Field of Classification Search ............. 455/456.1, 455/456.3, 404.3, 12.1, 13.1, 404.2, 456.2, 455/456.4; 342/357.01
See application file for complete search history.

(56) References Cited

U.S. PATENT DOCUMENTS

| | | | | |
|---|---|---|---|---|
| 5,724,660 | A | * 3/1998 | Kauser et al. | 455/456.2 |
| 6,640,106 | B2 | * 10/2003 | Gutowski et al. | 455/456.1 |
| 2004/0203853 | A1 | * 10/2004 | Sheynblat | 455/456.1 |

* cited by examiner

*Primary Examiner*—Tilahun Gesesse

(57) ABSTRACT

A method (400) and an apparatus for confirming the position of a mobile station (180). The mobile station (180) may receive a positioning message including information associated with a position of the mobile station. Based on that information, the mobile station (180) may generate a position parameter associated with the position of the mobile station (180). The mobile station (180) may compare the position parameter and a checkpoint value. Based on the position parameter and the checkpoint value, the mobile station (180) may generate an error value. The mobile station (180) may indicate an error associated with the position of the mobile station if the error value exceeds a predetermined error tolerance.

33 Claims, 2 Drawing Sheets

METHOD AND APPARATUS FOR CONFIRMING POSITION OF A MOBILE STATION

TECHNICAL FIELD

The present disclosure relates generally to wireless communication systems, and more particularly, to a method and an apparatus for confirming position of a mobile station.

BACKGROUND

A wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations is controlled by a base station controller. Thus, the base station controller operates in conjunction with the base station as part of the base station subsystem to provide the mobile station with real-time voice, data, and multimedia services (e.g., a call).

The mobile station reports to one or more base stations with the position of the mobile station for communication service and billing purposes. The base station may query the mobile station to report its position or the mobile station may autonomously report its position. For example, the mobile station may autonomously report its position by transmitting a mobile access message, i.e., a registration, to a base station that provides communication services to a communication cell where the mobile station is located. However, damage to the mobile station or other network equipment, or a high multipath environment (i.e., multiple erroneous signals caused by obstructions and buildings within the vicinity of the mobile station) may cause the mobile station to report an erroneous position of the mobile station to the base station. As a result of an inaccurate report of position, calls to and from the mobile station may be dropped or billed incorrectly.

One aspect of designing a wireless communication system is to ensure that reports of the position of a mobile station within the wireless communication system are reliable and accurate. It is especially important that base stations servicing the mobile station have correct information regarding the position of the mobile station so that the base stations may provide the mobile station with communication services (e.g., emergency service), and correctly bill for such services. Otherwise, calls may be dropped and billed incorrectly, and/or services may be misdirected because the base stations have incorrect information regarding the position of the mobile station.

Because traditional signal-level meters and other techniques to determine the location of a mobile station may not be necessarily accurate, and because of the possibility of damage to the mobile position calculation hardware and/or corruption of the mobile software load, the position of a mobile station reported to a base station may not be accurate and reliable. Therefore, a need exists for confirming the position of a mobile station in a wireless communication system.

BRIEF DESCRIPTION OF THE DRAWINGS

This disclosure will be described in terms of several embodiments to illustrate its broad teachings. Reference is also made to the attached drawings.

DETAILED DESCRIPTION

Figure 1:
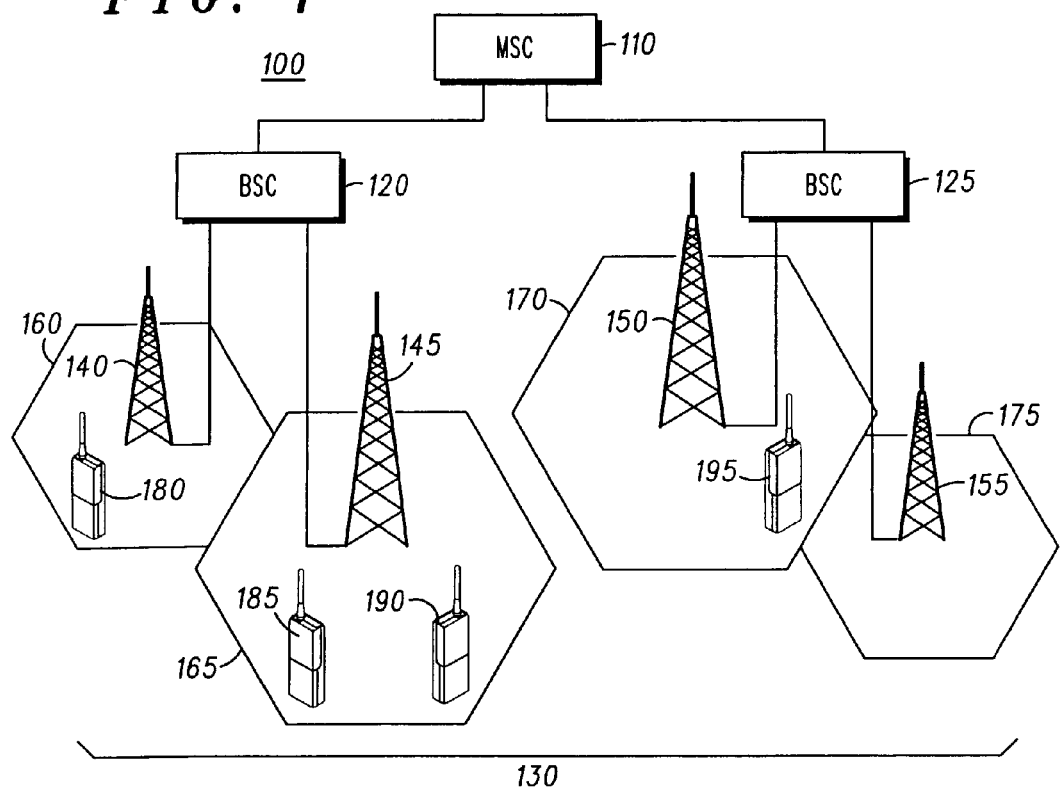
FIG. 1 is a block diagram representation of a wireless communication system.

A method and an apparatus for confirming the position of a mobile station in a wireless communication system are described herein. In a wireless communication system, a mobile station may autonomously report its position to a base station via a registration as persons of ordinary skill in the art will readily recognize. Alternatively, the base station may query the mobile station to report its position. To confirm the position reported to the base station, the mobile station may receive a positioning message from a positioning system such as, but not limited to, a global positioning system (GPS) or a forward link trilateration (FLT) system. The positioning message may be continuously transmitted from the position system to the mobile station. In particular, the position message may include, but is not limited to, information associated with the position of the mobile station. The mobile station may generate a position parameter based on the information associated with the position of the mobile station from the position system. The position parameter may be, but is not limited to, a celestial position parameter and a terrestrial position parameter. For example, the celestial position parameter may include a GPS value, and the terrestrial position parameter may include a FLT value.

Upon generating a position parameter, the mobile station may compare the generated position parameter and a checkpoint value associated with a checkpoint. The checkpoint value may be stored within the mobile station. Alternatively, a base station may provide the checkpoint value to the mobile station. The checkpoint may be established by either a wireless service provider (WSP) or a mobile station user. For example, the mobile station user may calibrate the mobile station with the position of the user's home (i.e., a first position) as the checkpoint. Accordingly, the mobile station may compare the position parameter with the checkpoint value associated with the first position when the mobile station reports that it is at the user's home. In another example, the mobile station user may also calibrate the mobile station with the position of the user's office (i.e., a second position) as another checkpoint. As noted above, the wireless service provider may also establish a checkpoint. In particular, the wireless service provider may define a plurality of positions as checkpoints such as, but not limited to, a street corner, a city block, or a building. For example, if the mobile station reports that it is at the corner of Dearborn Street and Maple Street, then the mobile station may compare the position parameter and the checkpoint value associated with the corner of Dearborn Street and Maple Street. Further, if the wireless service provider defined the Sears Tower in Chicago, Ill. as a checkpoint then the mobile station may report that is at the Sears Tower, and compare the position parameter with the checkpoint value associated with the Sears Tower. Based on the comparison of the position parameter and the checkpoint value as described above, the mobile station may generate an error value. If the error value exceeds a predetermined error tolerance then the mobile station may indicate that there is an error with the position of the mobile station reported to the base station.

A communication system is also described, and particularly, in terms of a wireless communication system operating in accordance with at least one of several communication standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95 Code Division Multiple Access (CDMA) digital cellular, CDMA 2000, the Personal Communications System (PCS), 3G, the Universal Mobile Telecommunications System (UMTS) and variations and evolutions of these protocols. As shown in FIG. 1, a wireless communication system 100 includes a mobile switching center (MSC) 110, a plurality of base station controllers (BSC), generally shown as 120 and 125, servicing a total service area 130. As is known for such systems, each BSC 120 and 125 has associated therewith a plurality of base stations (BS), generally shown as 140, 145, 150, and 155, servicing communication cells, generally shown as 160, 165, 170, and 175, within the total service area 130. The MSC 110, BSCs 120 and 125, and base stations 140, 145, 150, and 155 are specified and operate in accordance with the applicable standard or standards for providing wireless communication services to mobile stations (MS), generally shown as 180, 185, 190, and 195, operating in communication cells 160, 165, 170, and 175, and each of these elements are commercially available from Motorola, Inc. of Schaumburg, Ill.

Figure 2:
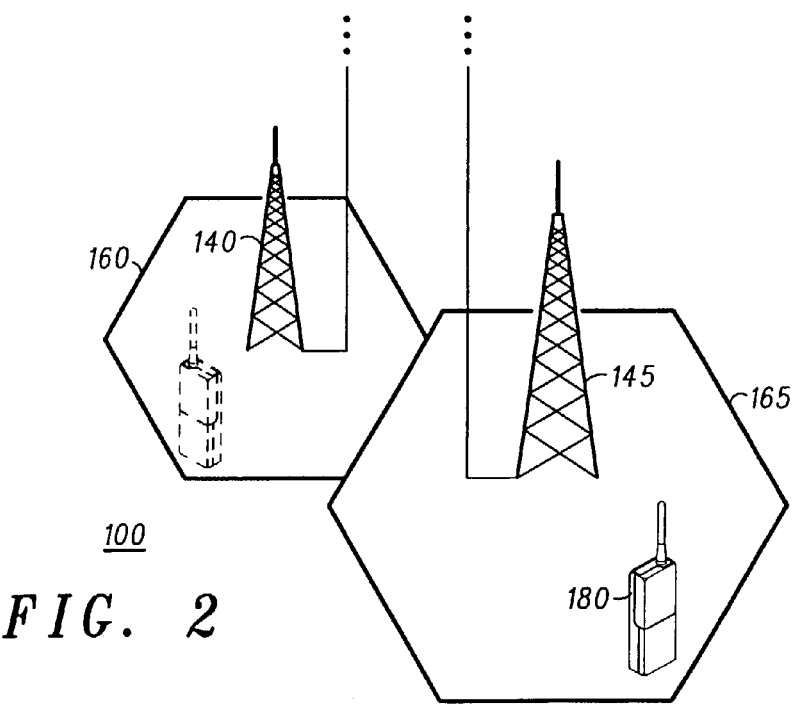
FIG. 2 is a block diagram representation of a plurality of communication cells.

A mobile station may report its position to a base station for different reasons. For example, a mobile station such as 180 in FIG. 1 may autonomously report its position via a registration to subscribe to communication services provided by a base station (one shown as 140 in FIG. 1). Referring to FIG. 2, when the mobile station 180 is in a first communication cell 160, the mobile station 180 may transmit a registration to a first base station 140, which provides communication services to mobile stations within the first communication cell 160. When the mobile station 180 is in a second communication cell 165, the mobile station 180 may transmit a registration to a second base station 145, which provides communication services to mobile stations within the second communication cell 165. The registration may report to the position of the mobile station 180 to the first and second base stations 140, 145. For example, the home of the mobile station user may be in the first communication cell 160. Accordingly, if the mobile station 180 is at the user's home then the mobile station 180 may transmit a registration to the first base station 140 to report its position is the user's home. In another example, the user's office is in the second communication cell 165. When the mobile station 180 is the user's office, the mobile station 180 may transmit a registration to the second base station 145 to report its position is the user's office.

Figure 3:
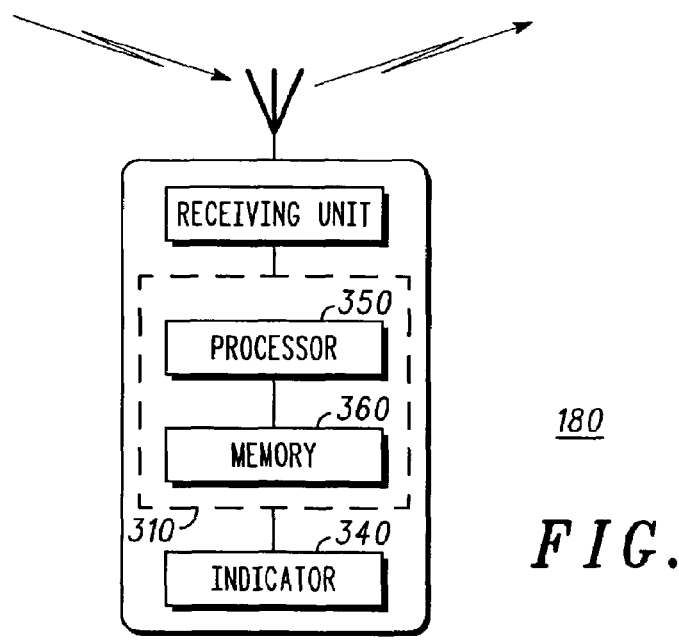
FIG. 3 is a block diagram representation of a mobile station.

As shown in FIG. 3, a mobile station (one shown as 180 in FIG. 1) adapted to confirm position of the mobile station in a wireless communication system is shown. In particular, the mobile station 180 generally includes a controller 310, a receiving unit 320, and an indicator 330. The controller 310 includes a processor 350 and a memory 360. The processor 350 is operatively coupled to the memory 360, which stores a program or a set of operating instructions for the processor 360. The processor 350 executes the program or the set of operating instructions such that the mobile station 180 operates as described herein. The program or the set of operating instructions may be embodied in a computer-readable medium such as, but not limited to, paper, a programmable gate array, application specific integrated circuit, erasable programmable read only memory, read only memory, random access memory, magnetic media, and optical media.

A basic flow for confirming the position of the mobile station 180 that may be applied with the mobile station 180 shown in FIGS. 2 and 3 may start with the mobile station 180 (e.g., via the receiving unit 320) receiving a positioning message from a positioning system. Persons of ordinary skill in the art that the mobile station 180 may receive a positioning message from many different positioning systems such as, but not limited to, a global positioning system (GPS) and a forward link trilateration (FLT) system. The position message may include information associated with a position of the mobile station 180 (i.e., position information). In particular, the position message may be, but is not limited to, a pseudo-range message from a global positioning system (GPS) and a power strength measurement message from a forward link trilateration (FLT) system. Based on the position information, the mobile station 180 may generate a position parameter. The position parameter may be, but is not limited to, a celestial position parameter and a terrestrial position parameter. In particular, the celestial position parameter may be, but is not limited to, a GPS value whereas the terrestrial position parameter may be, but is not limited to, an FLT value, an advanced forward link trilateration (AFLT) value and an amplitude difference, angle of arrival (AD-AOA) value. For example, the mobile station 180 may receive a pseudo-range message from a GPS to generate a celestial position parameter as one of ordinary skill in the art will readily recognize. The GPS value may provide altitude, latitude and longitude coordinates of the position of the mobile station 180. Alternatively, the mobile station 180 may receive a power strength measurement message from an FLT system to generate a terrestrial position parameter. The FLT value may also provide altitude, latitude and longitude coordinates of the position of the mobile station 180. In another example, both the GPS value and the FLT value may provide grid element values.

Alternatively, the position parameter may include a first position parameter and a second position parameter. For example, the mobile station 180 may generate both a celestial position parameter and a terrestrial position parameter associated with the position of the mobile station 180. That is, the first position parameter may be a celestial position parameter (e.g., a GPS value), and the second position parameter may be a terrestrial position parameter (e.g., an FLT value). As a result, the mobile station 180 may compare both the celestial position parameter and the terrestrial position parameter rather than just one or the other position parameter to compare with a checkpoint value as described in detail below.

Upon generating the position parameter, the controller 310 may determine whether the position reported to the base station 140 is corrected. That is, the controller 310 may compare the position parameter to a checkpoint value associated with a checkpoint, which may be a known position that is established by either a wireless service provider or a mobile station user. For example, the user may provide the wireless service provider with address information such as the billing address and the home address of the user when communication services were subscribed via a registration. Based on the address information provided by the user, the wireless service provider may establish the home of the user as a checkpoint in which a checkpoint value corresponds to that checkpoint, i.e., position information, network topology information, and a unique checkpoint identifier known to the wireless service provider. Other examples of a checkpoint may be, but is not limited to, a street corner, a landmark and a building in which position and network topology information are known to the service provider. The checkpoint value may be stored in either the memory 360 or a checkpoint database associated with the base station 140. In particular, the checkpoint value may be, but is not limited to, an altitude coordinate, a latitude coordinate, and a longitude coordinate (i.e., in units of degrees, minutes, seconds, and fractional seconds) of the checkpoint and network topology (i.e., expected received signals by the base station and their approximate signal levels based on calculated mobile position). The checkpoint value may also be in decimal units of degrees. For example, a checkpoint may be the user's home and the checkpoint value associated with that checkpoint is 42.8323° N/88.8323° W. As noted above, the checkpoint may be established by the user. In particular, the user may generate a checkpoint value associated with a checkpoint using a position system. For example, the user's home may be a checkpoint so a GPS may provide position information and the communications network may provide topology information to generate the checkpoint value of the user's home.

The controller 310 may generate an error value based on the position parameter and the checkpoint value. The indicator 330 may notify the mobile station user of an error associated with the position of the mobile station reported to a base station in response to the error value exceeding a predetermined error tolerance. The indicator 330 may be, but is not limited to, a light emitting diode (LED) to notify the mobile station user. In particular, if the error value exceeds a predetermined error tolerance, then the mobile station 180 indicates an error associated with the position reported to the base station 140 via the registration. Thus, the mobile station 180 may be located somewhere other than the checkpoint.

For example, the mobile station 180 may autonomously report to the base station 140 that its position is Checkpoint #1, which corresponds to the user's home in the first communication cell 160 (i.e., 42.8323° N/88.8323° W as noted above). To confirm the position reported to the base station 140, the mobile station 180 my receive a position message including position information associated with the mobile station 180 from a positioning system (e.g., a GPS). The mobile station 180 may generate a position parameter based on the position information. The position parameter may indicate that the mobile station 180 is in the second communication cell 165, which corresponds to 42.5000° N/88.5000° W. The mobile station 180 may compare the position parameter (42.5000° N/88.5000° W) and the checkpoint value associated with Checkpoint #1 in the first communication cell 160, i.e., the user's home (42.8323° N/88.8323° W). The mobile station 180 may generate an error value based on the comparison between the position parameter and the checkpoint value. If the error value exceeds the predetermined error tolerance then the mobile station 180 indicates an error associated with the position of the mobile station 180 reported to the base station 140.

The mobile station 180 may generate another position parameter based on position information provided by a different position system if the error value indicates a checkpoint rejection as described above. For example, the position parameter generated by the mobile station 180 as described above may be a first position parameter based on a celestial position system such as a GPS. If the mobile station 180 indicates an error based on the first position parameter then the mobile station 180 may generate a second position parameter based on position information provided by a second position system. The second position parameter may be based on a different position system because if the first position parameter is incorrect, then the mobile station 180 may still be able to confirm its position. The second position parameter, for example, may be based on a terrestrial position system such as an FLT system, and the first position parameter may be based on a celestial position system such as a GPS as noted above. If the first position parameter is incorrect because of equipment failure to the GPS, the mobile station 180 may confirm its position based on the second position parameter. In particular, the mobile station 180 may compare the second position parameter and the checkpoint value as described above to generate a second error value. Similarly, if the second error value indicates checkpoint rejection then the mobile station 180 may indicate an error associated with the position of the mobile station 180 reported to the base station 140.

In another example, the mobile station 180 may generate a first position parameter and a second position parameter, and compare the two position parameters to each other. That is, the base station 140 may query the mobile station 180 to report its position. The mobile station 180 may generate a celestial position parameter (i.e., the first position parameter) based on position information provided by a GPS, and a terrestrial position parameter (i.e., the second position parameter) based on position information provided by an FLT system. The mobile station 180 may compare the celestial position parameter and the terrestrial position parameter to generate an error value. Similarly, if the error value exceeds a predetermined error tolerance then the mobile station 180 may indicate an error associated with the position parameters.

Figure 4:
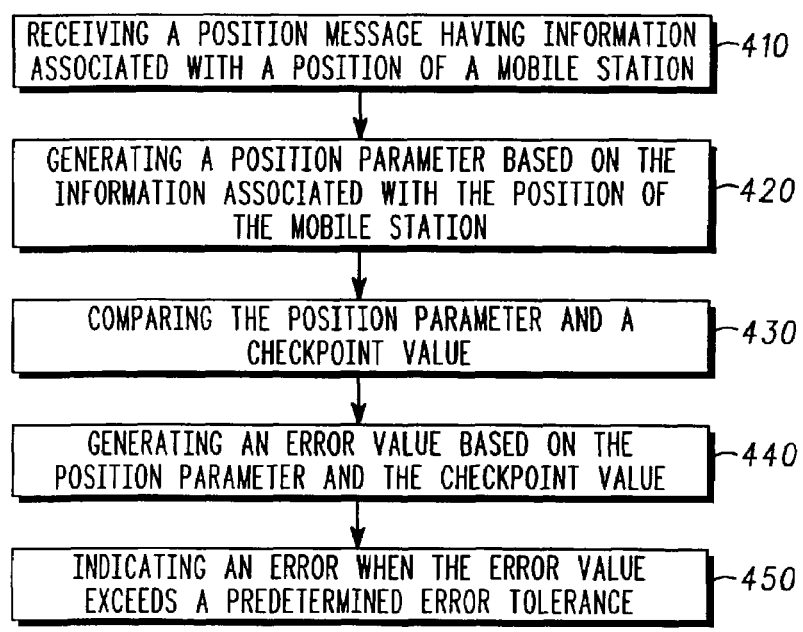
FIG. 4 is a flow diagram illustrating a method for confirming the relative position of a mobile station.

One possible implementation of the computer program executed by the mobile station 180 is illustrated in FIG. 4. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disk (CD), and a digital versatile disk (DVD). Thus, although a particular order of steps is illustrated in FIG. 4, persons of ordinary skill in the art will appreciate that the steps can be performed in other temporal sequences. Again, flow chart 400 is merely provided as an example of one way to program the mobile station 180 to confirm the position of the mobile station 180 reported to a base station in a wireless communication system. The flow chart 400 begins at step 410, wherein the mobile station 180 receives a position message including information associated with a position of the mobile station 180. At step 420, where the mobile station 180 generates a position parameter based on the information associated with the position of the mobile station 180 as one of ordinary skill in the art will readily recognize. In particular, the position parameter may be, but is not limited to, a celestial position parameter and a terrestrial position parameter. The celestial position parameter includes a GPS value, and the terrestrial position parameter includes an FLT value. In an alternate embodiment, the position parameter includes a first position parameter and a second position parameter. Accordingly, the first and second position parameters may be a celestial position parameter and a terrestrial position parameter, respectively. At step 430, the mobile station 180 compares the position parameter with a checkpoint value associated with a checkpoint. The checkpoint is associated with the position of the mobile station 180 reported to the base station. At step 440, the mobile station 180 generates an error value based on the comparison between the position parameter and the checkpoint value. At step 450, the mobile station 180 indicates an error associated with the position of the mobile station reported in the registration if the error value exceeds a predetermined error tolerance. In particular, the mobile station user or the service provider is notified that the position of the mobile station 180 reported to the base station is incorrect. As a result, the mobile station 180 confirms its position to avoid having a call dropped and/or billed incorrectly.

Many changes and modifications to the embodiments described herein could be made. The scope of some changes is discussed above. The scope of others will become apparent from the appended claims.

What is claimed:

1. In a wireless communication system providing communication services, wherein a mobile station reports a position of the mobile station within the communication system, a method for confirming the relative position of the mobile station comprising the steps of:
    receiving a positioning message having information associated with the position of the mobile station;
    generating a position parameter based on the information associated with the position of the mobile station;
    comparing the position parameter and a checkpoint value associated with a checkpoint, wherein the comparing is performed by the mobile station;
    generating an error value based on the position parameter and the checkpoint value, wherein the generating is performed by the mobile station; and
    indicating an error associated with the position of the mobile station if the error value exceeds a predetermined error tolerance.

2. The method of claim 1, wherein the position message is one of a pseudo-range message and a power strength measurement message.

3. The method of claim 1, wherein the position parameter includes a first position parameter and a second position parameter.

4. The method of claim 1, wherein the position parameter is one of a celestial position parameter and a terrestrial position parameter.

5. The method of claim 1, wherein the position parameter is one of a global positioning system (GPS) value, a forward link trilateration (FLT) value and an amplitude difference angle of arrival (AD-AOA) value.

6. The method of claim 1, wherein the position parameter includes one of a latitude coordinate, a longitude coordinate, and an altitude coordinate.

7. The method of claim 1, wherein the checkpoint value is a mobile station-reported position value.

8. The method of claim 1, wherein the checkpoint value includes one of a latitude coordinate, a longitude coordinate, and an altitude coordinate.

9. The method of claim 1, wherein the wireless communication system operates in accordance with one of a code division multiple access (CDMA) based communication system and a time division multiple access (TDMA) based communication system.

10. In a wireless communication system providing communication services, wherein a mobile station reports a position of the mobile station within the communication system, a method for verifying the position of the mobile station comprising the steps of:
    receiving a position message having information associated with the position of the mobile station;
    generating a first position parameter associated with the position of the mobile station based on the position message;
    comparing the first position parameter and a checkpoint value;
    generating a first error value based on the first position parameter and the checkpoint value;
    generating a second position parameter associated with the position of the mobile station based on the position message if the first error value exceeds a predetermined error tolerance;
    comparing the second position parameter and the checkpoint value;
    generating a second error value based on the second position parameter and the checkpoint value; and
    indicating an error associated with the position of the mobile station if the second error value exceeds the predetermined error tolerance, and
    wherein the mobile station compares the first position parameter, generates the second position parameter, compares the second position parameter and generates the second error value.

11. The method of claim 10, wherein the position message is one of a pseudo-range message and a power strength measurement message.

12. The method of claim 10, wherein the first position parameter is a celestial position parameter and the second position parameter is a terrestrial position parameter.

13. The method of claim 10, wherein the checkpoint value is a mobile station-reported position value.

14. The method of claim 10, wherein the checkpoint value includes one of a latitude coordinate, a longitude coordinate, and an altitude coordinate.

15. The method of claim 10, wherein the wireless communication system operates in accordance with one of a code division multiple access (CDMA) based communication system and a time division multiple access (TDMA) based communication system.

16. In a wireless communication system providing communication services, wherein a mobile station reports a registration including a position of the mobile station within the communication system, a mobile station that verifies its position, the mobile station comprising:

a receiving unit adapted to receive a position message having information associated with the position of the mobile station;

a controller having a processor and a memory operatively coupled to the processor, the controller being programmed to generate a position parameter based on the information associated with the position of the mobile station, the controller being programmed to generate an error value based on the position parameter and a checkpoint value; and an indicator coupled to the processor, the indicator being operable to provide an indication of an error associated with the position of the mobile station if the error value exceeds a predetermined error tolerance.

17. The mobile station of claim 16, wherein the position message is one of a pseudo-range message and a power strength measurement message.

18. The mobile station of claim 16, wherein the position parameter includes a first position parameter and a second position parameter.

19. The mobile station of claim 16, wherein the position parameter is one of a celestial position parameter and a terrestrial position parameter.

20. The mobile station of claim 16, wherein the position parameter is associated with a global positioning system (GPS) value, a forward link trilateration (FLT) value and an amplitude difference angle of arrival (AD-AOA) value.

21. The mobile station of claim 16, wherein the position parameter includes one of a latitude coordinate, a longitude coordinate, and an altitude coordinate.

22. The mobile station of claim 16, wherein the checkpoint value is a mobile station-reported position value.

23. The mobile station of claim 16, wherein the checkpoint value includes a latitude coordinate, a longitude coordinate, and an altitude coordinate.

24. The mobile station of claim 16 operates in accordance with one of a code division multiple access (CDMA) based communication system and a time division multiple access (TDMA) based communication system.

25. In a wireless communication system providing communication services for a communication cell, wherein a mobile station reports a registration including a position of the mobile station within the communication system, and wherein a processor of the mobile station operates in accordance to a computer program embodied on a computer-readable medium of the mobile station for verifying the position of the mobile station, the computer program comprising:

a first routine that directs the processor to receive a position message having information associated with the position of the mobile station;

a second routine that directs the processor to generate a position parameter based on the information associated with the position of the mobile station;

a third routine that directs the processor to compare the position parameter and a checkpoint value associated with a checkpoint;

a fourth routine that directs the processor to generate an error value based on the position parameter and the checkpoint value; and a fifth routine that directs the processor to indicate an error associated with the position of the mobile station if the error value exceeds a predetermined error tolerance.

26. The computer program of claim 25, wherein the position message is one of a pseudo-range message and a power strength measurement message.

27. The computer program of claim 25, wherein the position parameter includes a first position parameter and a second position parameter.

28. The computer program of claim 25, wherein the position parameter is one of a celestial position parameter and a terrestrial position parameter.

29. The computer program of claim 25, wherein the position parameter is associated with a global positioning system (GPS) value, a forward link trilateration (FLT) value and an amplitude difference angle of arrival (AD-AOA) value.

30. The computer program of claim 25, wherein the checkpoint value is a mobile station-reported position value.

31. The computer program of claim 25, wherein the checkpoint value includes a latitude coordinate, a longitude coordinate, and an altitude coordinate.

32. The computer program of claim 25 operates in accordance with one of a code division multiple access (CDMA) based communication system and a time division multiple access (TDMA) based communication system.

33. The computer program of claim 25, wherein the medium comprises one of paper, a programmable gate array, application specific integrated circuit, erasable programmable read only memory, read only memory, random access memory, magnetic media, and optical media.

* * * * *